O. G. HITCHCOCK.
VALVE FOR WASTE PIPES OR TUBES.
APPLICATION FILED JAN. 16, 1914.

1,127,622.

Patented Feb. 9, 1915.

Witnesses
Edwin L. Yewee
A. L. Mills

Inventor
Otto G. Hitchcock
By Percy B. Hills
Attorney

UNITED STATES PATENT OFFICE.

OTTO G. HITCHCOCK, OF ERIE, PENNSYLVANIA, ASSIGNOR TO HAYS MANUFACTURING COMPANY, OF ERIE, PENNSYLVANIA, A CORPORATION OF PENNSYLVANIA.

VALVE FOR WASTE PIPES OR TUBES.

1,127,622.     Specification of Letters Patent.     Patented Feb. 9, 1915.

Application filed January 16, 1914. Serial No. 812,425.

*To all whom it may concern:*

Be it known that I, OTTO G. HITCHCOCK, a citizen of the United States, residing at Erie, in the county of Erie, State of Pennsylvania, have invented new and useful Improvements in Valves for Waste Pipes or Tubes, of which the following is a specification.

Figure 1:
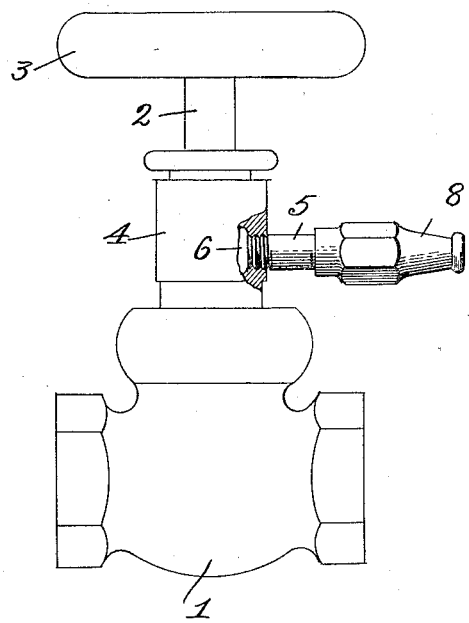
Figure 2:
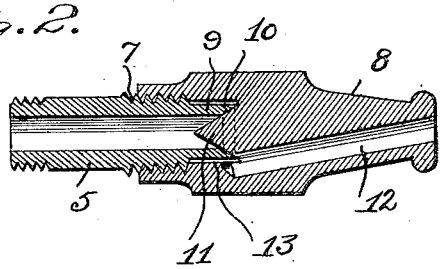

My invention relates to means for opening and closing the waste pipes or tubes for stop and other cocks or valves, and has for its object to provide certain improvements in the same as will be hereinafter more definitely pointed out and claimed, reference being had to the accompanying drawing, in which:

Figure 1 is a side elevation of a stop cock or valve with my improved waste pipe and closure applied thereto, said cock or valve being shown partly broken away. Fig. 2 is an enlarged detail longitudinal sectional view of my improved waste pipe and closure.

Similar numerals of reference denote corresponding parts in the two views.

In the said drawing the reference numeral 1 denotes the body or casing of an ordinary stop cock or valve, the same being provided with the usual valve stem 2 and hand wheel 3 for manipulating the valve thereof, and into the bonnet piece 4 of which is screwed the end of a waste pipe or tube 5. Said pipe or tube 5 communicates with a chamber 6 formed in the bonnet piece 4, which in turn communicates in any suitable manner with the valve casing 1 on one side of its valve, preferably through a duct in the valve stem 2 which will be sealed automatically by the opening of the valve of casing 1, as is common in valves of this type. Said pipe or tube 5 is screw threaded intermediate its length at 7 to receive the inner end of a nozzle 8, the extreme outer end 9 of said pipe or tube 5 beyond its screw threaded portion 7 being beveled on its inner surface at 10 to form a valve seat. The nozzle 8 is formed interiorly into a cone-shaped valve 11 adapted to seat in valve seat 10 and close the same when said nozzle is screwed to position on the pipe or tube 5.

The nozzle 8 is bored diagonally of its length at 12, said bore beginning centrally of the nozzle at its outer end and extending diagonally inward and terminating at one side of the cone-shaped valve 11, but communicating with a narrow annular chamber 13 formed between the outer end 9 of the pipe or tube 5 and the inner wall of the screw threaded inner end of said nozzle. In operation when the parts are in the position shown in Fig. 2 the valve 11 will be seated upon the valve seat 10, thus effectually closing the pipe or tube 5 against discharge. To open the same it is necessary only to unscrew said nozzle 8, which will unseat immediately the valve 11 and will permit the escape of fluid through pipe or tube 5 and bore 12, the rate of flow being governed by the distance that said nozzle is unscrewed.

Having thus described my invention, what I claim as new and desire to secure by Letters Patent is:

1. In a device of the class described, a waste pipe or tube, a nozzle in adjustable engagement therewith and formed with an internal annular chamber surrounding the end of said waste pipe or tube, said nozzle having a straight bore extending diagonally therethrough and communicating at its inner end with said annular chamber, and a valve and valve seat in said nozzle and pipe or tube, whereby the unseating of said valve from its seat will afford communication from said pipe or tube to said annular chamber and said diagonal bore.

2. In a device of the character described, a waste pipe or tube forming at its outer end a valve seat, and exteriorly screw threaded intermediate its length, a nozzle interiorly screw threaded at its inner end adjustably to engage said pipe or tube, and a conical valve in the interior of said nozzle adapted to register with said valve seat in said pipe or tube to close the same when the parts are screwed to position, said nozzle being provided with a straight longitudinal bore diagonally disposed and terminating at its inner end to one side of said valve in position to communicate with the interior of said pipe or tube when said valve is unseated.

3. In a device of the class described, a waste pipe or tube having a conical valve seat formed in its outer end and exteriorly screw threaded intermediate its length, a nozzle interiorly screw threaded at its inner end adjustably to engage said pipe or tube, and a conical valve in the interior of said nozzle adapted to seat in and close said valve seat in said pipe or tube when the parts are screwed to position, said nozzle being provided with a straight longitudinal bore diagonally disposed and terminating at its inner end to one side of said valve in position to communicate with the interior of said pipe or tube when said valve is unseated.

In testimony whereof, I have hereunto set my hand in the presence of two subscribing witnesses.

OTTO G. HITCHCOCK.

Witnesses:
 PERCY B. HILLS,
 JOSEPH J. ROLL.

Copies of this patent may be obtained for five cents each, by addressing the "Commissioner of Patents, Washington, D. C."